(12) United States Patent
Busi

(10) Patent No.: US 7,937,972 B2
(45) Date of Patent: May 10, 2011

(54) METHOD FOR MAKING AN ITEM OF CLOTHING LIKE AN ANKLE SOCK

(75) Inventor: Mauro Busi, Brescia (IT)

(73) Assignee: Steps, S.L., Andorra ( * ) Notice: Subject to any disclaimer, the term of this patent is extended or adjusted under 35 U.S.C. 154(b) by 99 days.

(21) Appl. No.: 12/518,836

(22) PCT Filed: Nov. 26, 2007

(86) PCT No.: PCT/IB2007/003680
§ 371 (c)(1),
(2), (4) Date: Oct. 13, 2009

(87) PCT Pub. No.: WO2008/072048
PCT Pub. Date: Jun. 19, 2008

(65) Prior Publication Data
US 2010/0037370 A1  Feb. 18, 2010

(30) Foreign Application Priority Data

Dec. 12, 2006 (IT) .............................. MI2006A2383

(51) Int. Cl.
*D04B 9/46* (2006.01)
(52) U.S. Cl. ............................................. 66/19; 66/185
(58) Field of Classification Search ................ 66/19, 20, 66/21, 22, 23, 24, 25, 26, 27, 28, 185, 178 R, 66/186, 187, 194; 2/239, 240
See application file for complete search history.

(56) References Cited

U.S. PATENT DOCUMENTS

| | | | | |
|---|---|---|---|---|
| 4,277,959 A | * | 7/1981 | Thorneburg | .................... 66/182 |
| 4,304,108 A | | 12/1981 | Chamlee | |
| 5,560,226 A | * | 10/1996 | Thorneburg | .................... 66/185 |
| 5,603,232 A | * | 2/1997 | Thorneburg | .................... 66/185 |
| 5,791,163 A | * | 8/1998 | Thorneburg | ................ 66/178 R |
| 6,173,589 B1 | * | 1/2001 | Hayes et al. | .................... 66/171 |
| 6,230,525 B1 | * | 5/2001 | Dunlap | .................... 66/182 |
| 6,415,632 B1 | | 7/2002 | Vesnaver | |
| 6,735,988 B1 | * | 5/2004 | Honeycutt | .................... 66/185 |
| 7,738,991 B2 | * | 6/2010 | Klumpp | .................... 700/141 |
| 2003/0182974 A1 | | 10/2003 | Ando | |

FOREIGN PATENT DOCUMENTS

EP 0454631 10/1991
WO WO 00/19846 A 4/2000

OTHER PUBLICATIONS

PCT International Search Report for PCT/IB2007/003680 completed by the EP Searching Authority on Apr. 11, 2008.

* cited by examiner

Primary Examiner — Danny Worrell
(74) Attorney, Agent, or Firm — Barnes & Thornburg LLP

(57) ABSTRACT

A method for making, through a circular machine for making socks with alternate motion, an item of clothing like an ankle sock in "continuum" stitched without seams to form a single piece made up of a front end elongated in the shape of a pocket, that can be associated with the toe of the foot and comprising a first and a second front portion, a rear end, also pocket-shaped, able to be associated with the heel of the foot and comprising a first and a second rear portion, and a connecting part between the front and rear ends, comprising a sole portion and two side portions, having an opening in which to insert the foot, all of the portions of the ankle sock being made with stitching steps, in which such a method foresees many simultaneous independent yarn-feeders during all of the quoted stitching steps to obtain a single ankle sock.

21 Claims, 2 Drawing Sheets

METHOD FOR MAKING AN ITEM OF CLOTHING LIKE AN ANKLE SOCK

CROSS-REFERENCE TO RELATED APPLICATIONS

Figure 1:
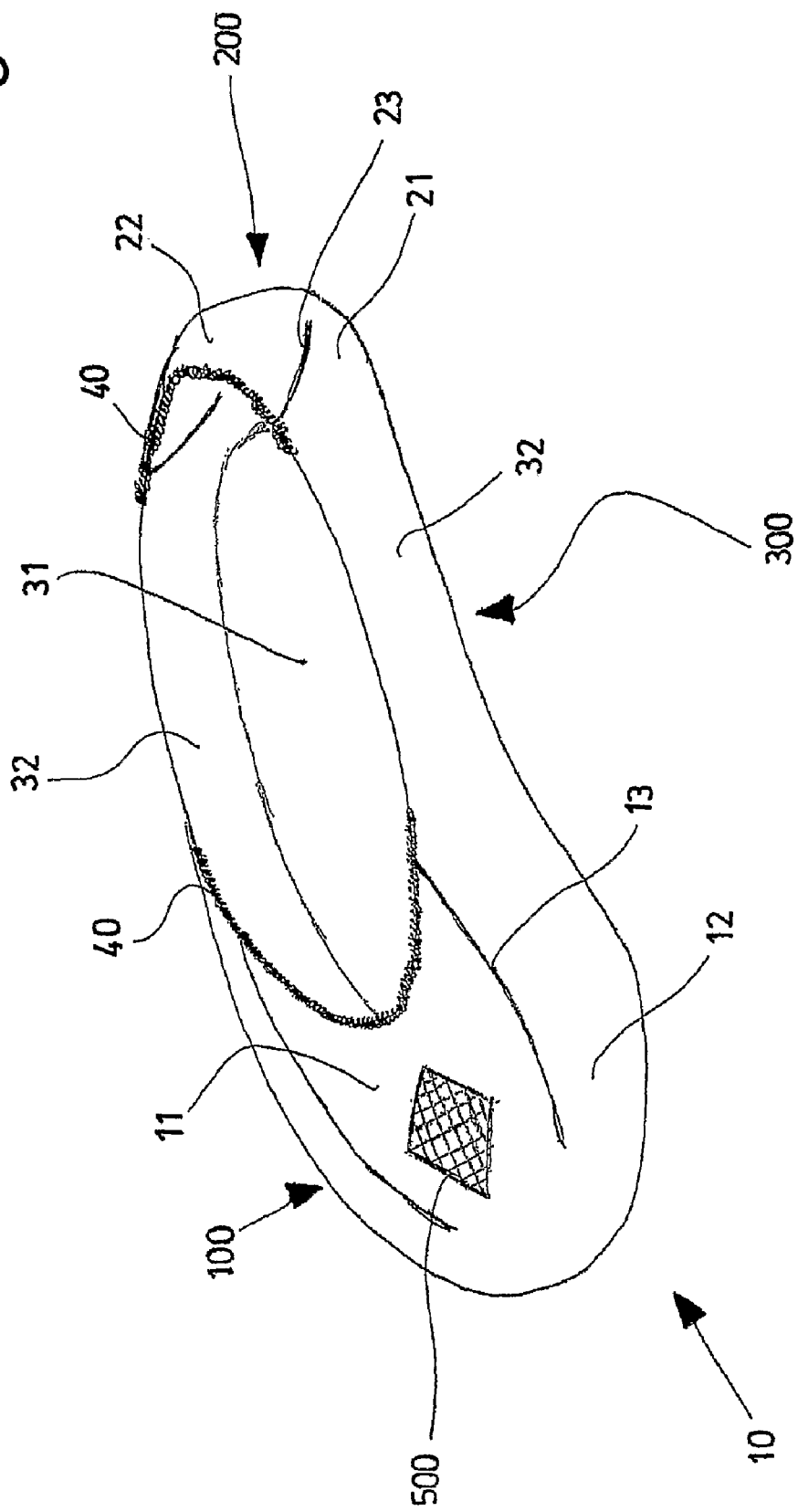

This application is a U.S. national counterpart application of international application serial No. PCT/IB2007/003680 filed Nov. 26, 2007, which claims priority to Italian Patent Application No. MI2006A 002383 filed Dec. 12, 2006.

The present invention refers to a method for making an item of clothing like an ankle sock or similar items of clothing; in particular it concerns the production of short socks suitable for being hidden by a user's footwear during use.

Currently, since such items of clothing have become common clothing accessories, there are various methods for making them, even very different from one another, linked to the use of special circular sock machines.

Indeed, although the overall appearance of the ankle sock end product is generally very simple and, as disclosed in EP 0632972, always has a front end elongated in the shape of a pocket, which can be associated with the toe of the foot, a rear end, also pocket shaped, able to be associated with the heel of the foot, and a connecting part that can be associated with the sole and with the side regions of the foot with an opening into which the foot is inserted.

The methods used today to make it have many different aspects from each other.

In particular, the methods of production generally used today fit into two categories: those in which the end product represents a "continuum" stitched without seams to form a single piece and on the other hand those in which at least one seam can be identified between the parts that constitute the end product.

The first of the two methods quoted above comprises a series of stitching steps that can be carried out through a circular sock machine with mono yarn-feeder alternate motion, with which an end product without seams is obtained to form a single piece.

This method is disclosed in patent EP 1133245, that is a method for making socks, through a circular machine with alternate motion, in "continuum" stitched.

By the method according to this patent a single course per cycle is being stitched. The heel and toe portions can not have embroidered or coloured parts without making use of processing that must necessarily follow the stitching.

Therefore, in these portions loose yarns are, inside or outside, necessarily present.

The second method existing today comprises a series of stitching steps through a circular sock machine with continuous/alternate motion having mono or multi yarn-feeder.

Such a method allows an ankle sock to be obtained in which there can also be embroidered and/or coloured portions.

However, this second method also has some disadvantages, like for example the presence of at least one connecting seam; indeed, the product is not processed in "continuum" to form a single piece without seams, and moreover there is the presence of loose yarns on the reverse of the knitted area at the regions with inlay and/or coloured patterns.

The purpose of the present invention is to make a method capable of solving the aforementioned drawbacks of the prior art, as disclosed in patent EP1133245, in an extremely simple, cost-effective and particularly functional way.

Another purpose is to make a method for producing, through a circular machine for making socks with alternate motion, an item of clothing like an ankle sock in "continuum" stitched without seams to form a single piece that reduces the current production time.

Yet another purpose is to be able to make a method for producing, through a circular machine for making socks with alternate motion, an item of clothing like an ankle sock in "continuum" stitched without seams to form a single piece in which there are embroidered and/or coloured inlayed portions without loose yarns on the reverse of the knitted area.

These purpose are accomplished thanks to a method for making, through a circular machine for making socks with alternate motion, an item of clothing like an ankle sock in "continuum" stitched without seams to form a single piece in which the stitching steps to obtain a single ankle sock foresee many simultaneous independent yarn-feeders, as outlined in claim 1.

Further characteristics of the method object of the invention are outlined by the subsequent claims.

The characteristics and advantages of a method for making an item of clothing like an ankle sock according to the present invention shall become clearer from the following description, given as a non-limiting example, referring to the figure that shows, in a perspective view, an item of clothing of the ankle sock type as can be made.

With reference to the FIG. 1, an item of clothing of the ankle sock stitched without seams to form a single piece is shown with 10.

Figure 2:
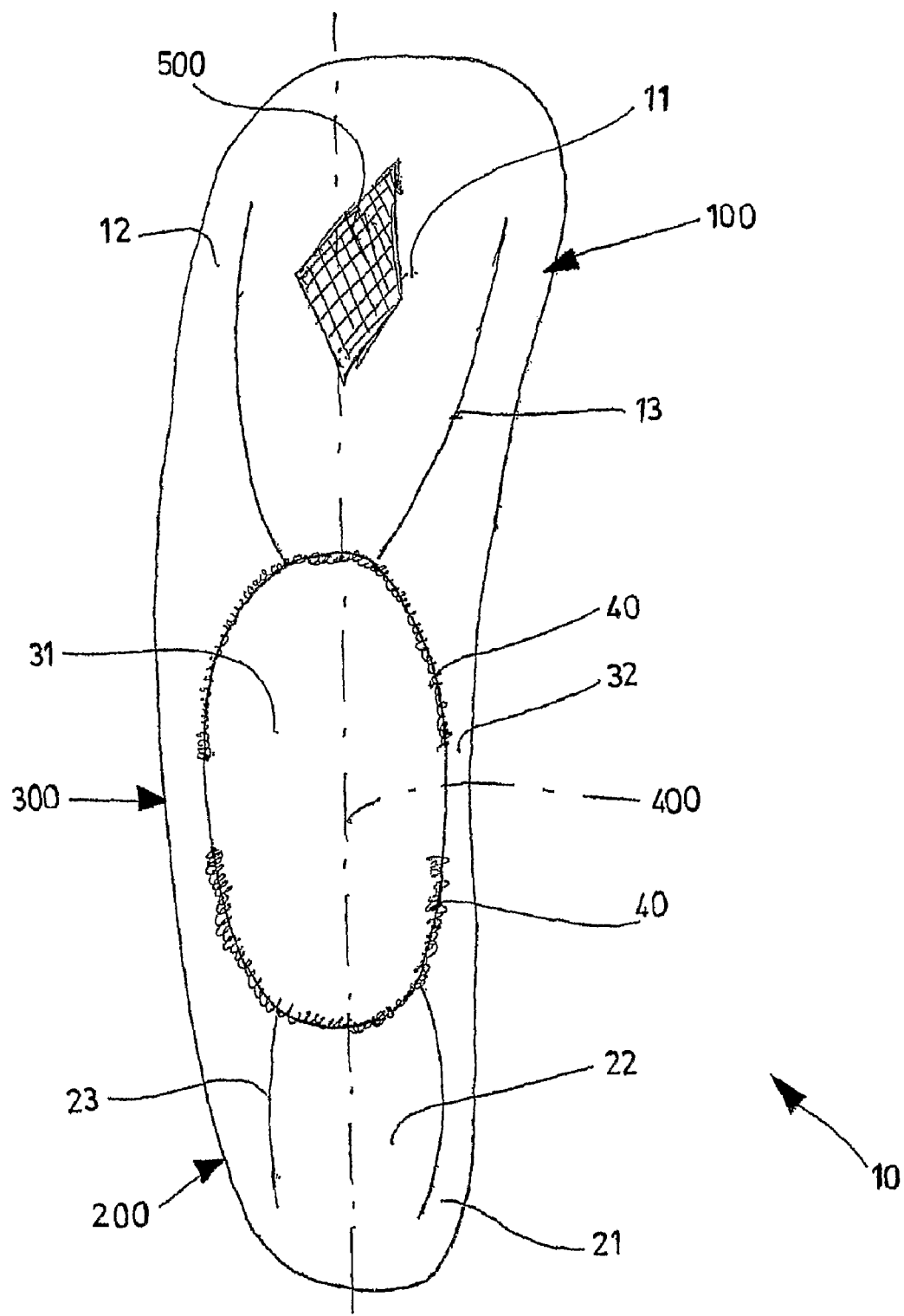

In FIG. 2 is shown with 10 a different type of item of clothing of the ankle sock stitched without seams to form a single piece obtainable only with the method object of the present invention.

It comprises a front end 100, a rear end 200 and a connecting part 300 between said front end 100 and rear end 200.

The front end 100, which is elongated and pocket-shaped, is the part of the ankle sock associated with the toe of the foot and, as can be seen in the figure, it comprises a first top front portion 11, and a second bottom front portion 12, different in appearance, length and shape to the part 200 also in terms of form of stitching that can be seen.

Like the front end 100, the rear end 200 is also pocket-shaped and comprises two parts; a first bottom rear portion 21, and a second top rear portion 22.

The aforementioned connecting part 300 between the front and rear ends 100, 200 has a sole portion 31 and two side portions 32 that can be associated with the side regions of the foot.

As is clear from the figure, such a connecting part 300 also has an opening in which to insert the foot.

All of the aforementioned portions 11, 12; 21, 22; 31, 32 of the ankle sock 10 are made with a circular machine for making socks with alternate motion through a process comprising various stitching steps, in particular, according to the invention, while all of these steps are carried out it is foreseen, so as to obtain each individual ankle sock 10, to simultaneously use many independent yarn-feeders.

By the term "many yarn-feeders" we mean a particular stitching procedure in which the cylinder of the circular machine for making socks (not shown) is fed in many different sectors with weft yarns. This means that for a machine cycle many courses can be stitched simultaneously.

The aforementioned stitching steps with many simultaneous independent yarn-feeders that make up the method object of the invention that makes an ankle sock 10 can be summarised in the following steps:

stitching the first front portion 11 through lift stitching;

stitching the second front portion 12 through alternate lift and lower stitching joining it continuously to the first front portion 11 along a front weaving line 13;

stitching the connecting part 300, which as indicated above is equipped with a top opening, a sole portion 31 and two side portions 32, joining it continuously to the second front portion 12;

stitching the first rear portion 21 through lift stitching, joining it continuously to the connecting part 300;

stitching the second rear portion 22 through alternate lift and lower stitching joining it continuously to the first rear portion 21 along a rear weaving line 23.

Advantageously at intervals while the stitching steps by lifting and by alternate lifting and lowering mentioned above are carried out it is also possible to insert courses in "pause" from lowering or lifting, i.e. it is possible to carry out some stitching cycles without increasing or decreasing the number of needles operating per cycle thus extending the depth of the front end 100 or rear end 200 for the same width.

Also advantageously, again at intervals while the stitching steps by lifting and by alternate lifting and lowering mentioned above are carried out, it is possible to carry out some cycles, known as "alternate pauses", in which an increase or decrease in the number of stitches is foreseen on just one side of the ankle sock 10 leaving the stitches on the other side constant, i.e. in "pause".

Such a stitching process with "alternate pauses" thus leads to the creation of an ankle sock that is not longitudinally symmetrical but having a shape tending to the right or left to better fit onto the right or left foot of the user.

In the aforementioned steps by the term "lift stitching" we mean a particular stitching procedure in which, starting with a predetermined number of operative needle present on the cylinder of the circular machine for making socks with alternate motion, the number of weaving needles is progressively reduced taking away at least one needle per side of the cylinder for each feeder and for each machine cycle. In this way a progressive decrease in size of the stitched product is obtained.

By the term "alternate lift and lower stitching", on the other hand, we mean a stitching procedure in which, starting with a predetermined number of operative needle present on the cylinder of the circular machine for making socks with alternate motion, for each machine cycle at least one needle is progressively brought back into the operative step per side of the cylinder for each feeder. In this way a progressive increase in size of the stitched product is obtained.

The "lift stitching" and "alternate lift and lower stitching" steps carried out in succession, and possibly alternating with stitching steps in "pause" or in "alternate pause", thus lead to the creation of a pocket-shaped element, like the front end 100 and rear end 200 of the ankle sock 10, independent from each other and that can also have a different shape, length and width.

Indeed, by proceeding with stitching steps in "pause" in making the front end 100 it is possible to obtain a more elongated shape with respect to the rear end 200.

Moreover, by proceeding with stitching steps in "alternate pause", it is possible to obtain a different shape for the right and left ankle sock.

This example is shown in FIG. 2.

Advantageously, the simultaneous stitching of many courses in a single machine cycle, thanks to the use of many simultaneous independent yarn-feeders, offers a substantial gain in terms of production time.

The steps of the multi yarn-feeder stitching method listed above begin with the processing of the front end 100 but alternatively it is possible to begin with the stitching of the rear end 200.

Such a method thus makes an item of clothing like an ankle sock 10 in shorter production times because, for each alternate motion stitching cycle of the circular machine for making socks, all of the yarn-feeders can each independently stitch a course.

For example, by using three yarn feeders, or feeds, it is possible to produce an item of clothing like an ankle sock 10 in "continuum" stitched without seams to form a single piece in a third of the time currently required.

Moreover, advantageously, since the yarn-feeders are independent, it is possible to use at least one yarn-feeder to stitch at least one course and at least one other yarn-feeder to simultaneously embroider in the same machine cycle.

In this way there can also be embroidered and/or coloured inlayed portions 500 on the ankle sock 10 without loose yarns on the reverse of the knitted area.

Finally, said method can also foresee steps, still in "continuum" through multi yarn-feeder stitching, to make an elastic band 40 on the top regions of said rear end 200 and front end 100.

It has thus been seen that a method for making an item of clothing like an ankle sock 10 according to the present invention achieves the purposes outlined previously.

In fact, many simultaneous independent yarn-feeders allow to realize an item of clothing like an ankle sock 10 as that disclosed in the method object of the patent EP 1133245 but faster, since all the yarn-feeders stitch independently a different course.

Moreover, only the method object of the present invention allows to realize an item of clothing like an ankle sock 10 in "continuum" stitched without seams having a portion of different material or colour where no loose yarns are present.

At last, only the method object of the present invention allows to realize an item of clothing like an ankle sock 10 in "continuum" stitched without seams having heel and/or toe portions with an a-symmetric shape regarding the central axis 400 in order to better adapt itself to the right or left foot.

The method for making an item of clothing like an ankle sock of the present invention thus conceived can undergo numerous modifications and variations, all of which are covered by the same inventive concept.

Moreover, in practice the materials used, as well as their sizes and the components, can be whatever according to the technical requirements.

The invention claimed is:

1. Method for making, through a circular machine for making socks with alternate motion, an item of clothing like an ankle sock (10) in continuum stitched without seams to form a single piece made up of a front end (100) elongated in the shape of a pocket, which can be associated with the toe of the foot and comprising a first and a second front portion (11,12), a rear end (200), also pocket shaped, able to be associated with the heel of the foot and comprising a first and a second rear portion (21,22), and of a connecting part (300) between the front end (100) and rear end (200), comprising a sole portion (31), two side portions (32) and a top opening between the side portions (32) in which to insert the foot, comprising the following steps of alternate motion stitching:

a) stitching the first front portion (11) through a decrease in number of stitches;

b) stitching the second front portion (12) through an increase in number of stitches, the second front portion

(12) being joined to the first front portion (11) continuously along a front gore line (13);

c) stitching the connecting part (300) equipped with the top opening, the sole portion (31) and the two side portions (32), the connecting part (300) being continuously joined to the front end (100);

d) stitching the first rear portion (21) through decrease in number of stitches, 20 the second rear portion (21) being continuously joined to the connecting part (300);

e) stitching the second rear portion (22) through increase in number of stitches, the second rear portion (22) being continuously joined to the first rear portion (21) along a rear gore line (23);

characterised in that all of the steps of alternate motion stitching are realized by many simultaneous independent yarn-feeders to obtain the item of clothing like the single ankle sock (10).

2. Method for making an item of clothing like an ankle sock (10) according to claim 1, characterised in that in at least one of the step of alternate motion stitching of the front end (100) and/or the rear end (200) and/or the connecting part (300) at least one yarn-feeder stitches a course and at least one other yarn-feeder simultaneously embroiders to realize the front end (100) and/or the rear end (200) and/or the connecting part (300) comprising at least a portion (500) embroidered without, inside and outside, loosing yarns.

3. Method for making an item of clothing like an ankle sock (10) according to claim 2, characterised in that the at least one other yarn-feeder suitable for embroidering, can embroider with different coloured yarns to those used by the at least one yarn-feeder suitable for stitching.

4. Method for making an item of clothing like an ankle sock (10) according to claim 3, characterised in that the at least one other yarn-feeder suitable for embroidering can embroider with yarns of different material to those used by the at least one yarn-feeder suitable for stitching.

5. Method for making an item of clothing like an ankle sock (10) according to claim 2, characterised in that the at least one other yarn-feeder suitable for embroidering can embroider with yarns of different material to those used by the at least one yarn-feeder suitable for stitching.

6. Method for making an item of clothing like an ankle sock (10) according to claim 2, characterised in that the method comprises a further step of alternate motion stitching that consists of stitching without increasing or decreasing the number of needles operating per cycle, the step being carried out in intervals during the steps a),b),c) and d).

7. Method for making an item of clothing like an ankle sock (10) according to claim 2, characterised in that the method comprises a further step that consists of alternate motion stitching increasing or decreasing the number of stitches per cycle only on one side of the item of clothing like the ankle sock (10) leaving the number of stitches on the other side of the item of clothing like the ankle sock (10) constant, the step being carried out in intervals during the steps a) and b).

8. Method for making an item of clothing like an ankle sock (10) according to claim 2, characterised in that the method can alternatively start with the stitching of the rear end (200) and end with the stitching of the front end (100).

9. Method for making an item of clothing like an ankle sock (10) according to claim 2, characterised in that the method further comprises the step of stitching of an elastic band (40) on the top regions of the rear end (200) and front end (100).

10. Method for making an item of clothing like an ankle sock (10) according to claim 2, characterised in that for each alternate motion stitching cycle all of the yarn-feeders each independently stitch a course.

11. Method for making an item of clothing like an ankle sock (10) according to claim 1, characterised in that the method comprises a further step of alternate motion stitching that consists of stitching without increasing or decreasing the number of needles operating per cycle, the step being carried out in intervals during the steps a),b),c) and d).

12. Method for making an item of clothing like an ankle sock (10) according to claim 1, characterised in that the method comprises a further step that consists of alternate motion stitching increasing or decreasing the number of stitches per cycle only on one side of the item of clothing like the ankle sock (10) leaving the number of stitches on the other side of the item of clothing like the ankle sock (10) constant, the step being carried out in intervals during the steps a) and b).

13. Method for making an item of clothing like an ankle sock (10) according to claim 1, characterised in that the method can alternatively start with the stitching of the rear end (200) and end with the stitching of the front end (100).

14. Method for making an item of clothing like an ankle sock (10) according to claim 1, characterised in that the method further comprises the step of stitching of an elastic band (40) on the top regions of the rear end (200) and front end (100).

15. Method for making an item of clothing like an ankle sock (10) according to claim 1, characterised in that for each alternate motion stitching cycle all of the yarn-feeders each independently stitch a course.

16. Item of clothing like an ankle sock (10) realized according to method of claim 1 through a circular machine for making socks with alternate motion in continuum stitched without seams to form a single piece made up of a front end (100) elongated in the shape of a pocket, which can be associated with the toe of the foot and comprising a first and a second front portion (11,12), a rear end (200), also pocket shaped, able to be associated with the heel of the foot and comprising a first and a second rear portion (21,22), and of a connecting part (300) between the front end (100) and rear end (200), comprising a sole portion (31), two side portions (32) and an opening between the side portions in which to insert the foot, characterised in that the first and second front portions (11,12), the connecting part (300) and the first and second rear portions3 (21,22) are each realized by alternate motion stitching with many yams.

17. Item of clothing like an ankle sock (10) according to claim 16 characterised in that the front end (100) and/or the rear end (200) and/or the connecting part (300) comprise at least a portion (500) embroidered without, inside and outside, loosing yarns.

18. Item of clothing like an ankle sock (10) according to claim 17, characterised in that the front end (100) and/or the rear end (200) shows an elongated shape with cylindrical portions having a constant width.

19. Item of clothing like an ankle sock (10) according to claim 17, characterised in that the front end (100) shows an a-symmetric shape regarding the central axis (400).

20. Item of clothing like an ankle sock (10) according to claim 16, characterised in that the front end (100) and/or the rear end (200) shows an elongated shape with cylindrical portions having a constant width.

21. Item of clothing like an ankle sock (10) according to claim 16, characterised in that the front end (100) shows an a-symmetric shape regarding the central axis (400).

* * * * *